Nov. 3, 1959   R. P. LENT ET AL   2,910,952
MARINE VESSEL PROPULSION SYSTEM SEALS AND
PASTE METHODS OF FABRICATING SAME
Filed Aug. 26, 1955
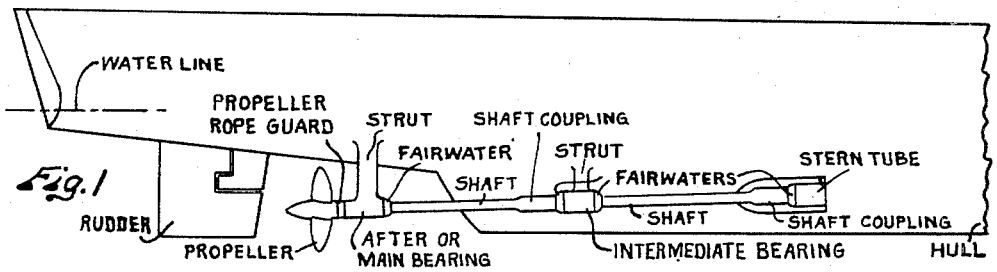
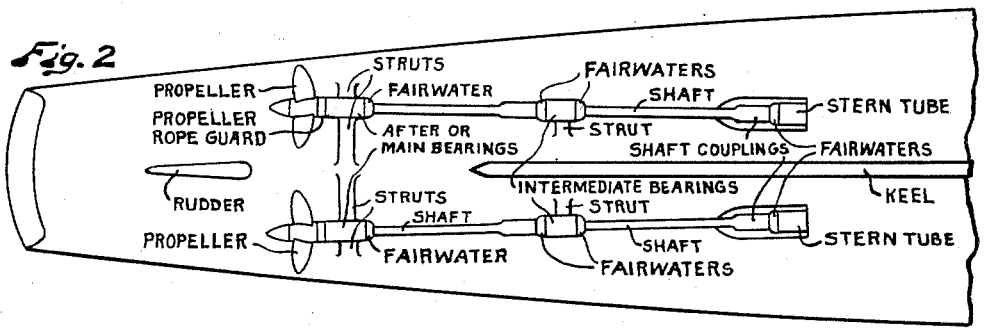
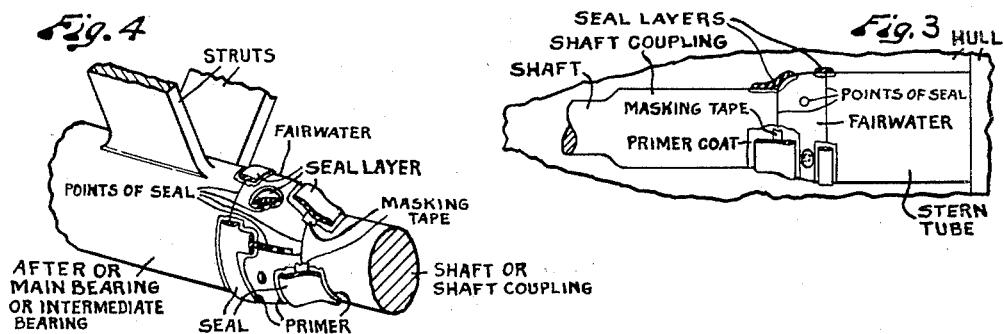
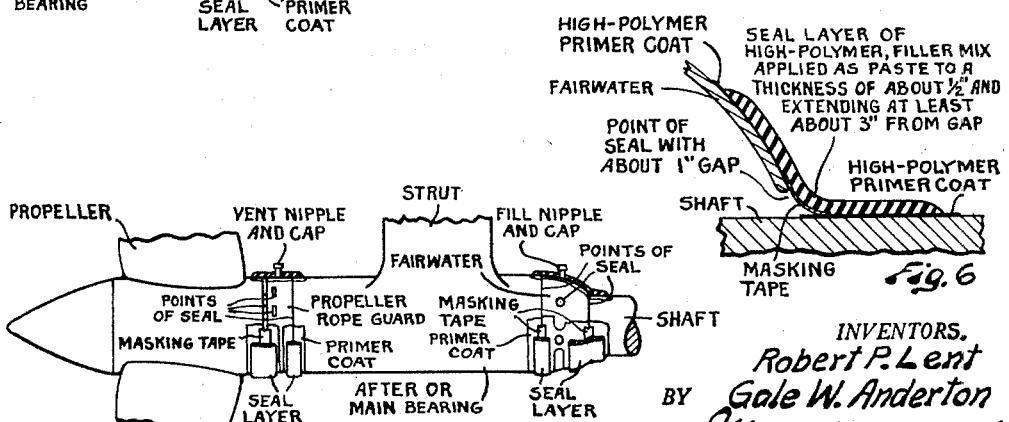
INVENTORS.
Robert P. Lent
Gale W. Anderton
BY
$\mathscr{G. Wright Arnold}$
ATTORNEY

United States Patent Office 2,910,952
Patented Nov. 3, 1959

2,910,952
MARINE VESSEL PROPULSION SYSTEM SEALS AND PASTE METHODS OF FABRICATING SAME

Robert P. Lent and Gale W. Anderton, Seattle, Wash., assignors to Technical Research Company, Seattle, Wash., a corporation of Washington Application August 26, 1955, Serial No. 530,897

10 Claims. (Cl. 114—.5)

The present invention and discovery relates to marine vessel propulsion system seals, and methods of preserving and reactivating propulsion systems of inactivated marine vessels, involving the sealing, preservation and reactivation of stern tubes, strut bearings, and propeller shafts thereof, and the like. More particularly, the present invention and discovery relates to marine vessel underwater bearing seals and paste methods of bearing preservation achieving marked improvements in simplicity, economy, and reliability, wherein the bearing sealant material comprises a polymeric system capable of being cured at drydock temperatures or slightly above, the cured seal having a cohesive tensile strength less than its adhesive tensile strength to enable the propulsion system of the vessel to be activated merely by jacking the propeller shaft to break the bearing seals at the points of seal, without the necessity of submerging a diver for this purpose, as is required by conventional practice, the uncured bearing seal forming material further having a finite yield strength value exceeding the shearing stress of its own weight during curing thereof, thus preserving the thickness dimension of the seal during curing thereof, such rheological property being achieved in the specific examples of practice of the present invention hereinafter set forth by incorporation of a filler in the polymeric system, said filler serving as a thickening and strengthening agent.

Objects and advantages of the present invention include the provision of marine vessel propulsion system bearing seals and methods of fabricating same, to overcome the problems of providing simple and effective underwater seals, particularly where adjacent propulsion system surfaces are of irregular contour and/or are pitted, eroded or otherwise difficult to seal, as at the stern tubes or at the rope guards when the propeller blade leading edge rises abruptly from the propeller hub; wherein is employed a quick-curing bearing seal forming composition having the rheological properties of a solid, applied as a paste to thicknesses of an inch or more without substantial sagging; wherein the bearing seals can be fabricated independently of other shipyard trades such as welders, thereby expediting completion of the seals at minimum cost with maximum efficiency in terms of man-hours and drydock time; wherein the seals are highly resistant to sea water deterioration and pressures, and resistant to preservative solution deterioration and pressures, and meet exisiting inactivation specifications as to durability and long life; and wherein such seals eliminate the need for any external wrappings, "boots" or "corsets," as are heretofore customarily employed, and also eliminate any need for various custom fabricated fittings and assemblies.

Figures 1 and 2, with accompanying legends, schematically illustrate respective side and bottom views of the stern portion of a typical marine vessel hull, showing the propulsion system thereof, the U.S. Navy light cruiser U.S.S. San Diego (CLAA 53), with its dual shaft propulsion system being selected by way of representative example.

Fig. 3 illustrates, in fragmentary side view, that portion of the propulsion system shown in Figures 1 and 2 adjacent one of the stern tubes, with bearing seals characteristic of the present invention fabricated thereon, and with various portions of the seals broken away, the thickness of the seals being necessarily exaggerated for clarity of illustration.

Fig. 4 similarly presents a fragmentary perspective view of a portion of either an intermediate or an after strut bearing and an associated fairwater and propeller shaft segment, with bearing seals characteristic of the present invention applied thereto, and with various portions of the seals broken away.

Fig. 5 similarly presents in fragmentary form a side view of an after strut bearing of the propulsion system shown in Figures 1 and 2, with the associated propeller shaft, fairwater, propeller rope guard and propeller, with bearing seals and filling and venting nipples characteristic of the present invention applied thereto, and with various portions of the seals broken away.

Fig. 6 presents a segment of a seal between a propeller shaft and a fairwater, showing typical dimensional considerations characterizing the present invention.

It will be understood that the stern tube and strut bearings of a marine vessel are water lubricated operationally and that the strut bearing barrels are several feet in length on capital ships. By conventional design, and as shown in the various views of Figs. 1 through 5, the external contour of the shaft and strut bearings in practically all cases is streamlined by arrangement of fairwaters extending from the leading and trailing edges of the intermediate strut bearing barrels and extending from the leading edge of the after strut bearing barrel. Such fairwaters comprise two laterally arranged sections bolted together to present an external tear-drop contour sloping from the dimension of the strut bearing barrel adjacent thereto to a reduced dimension slightly greater than the diameter of the propeller shaft, the order of magnitude of the gap between the shaft and adjacent edge of the fairwater being about 1½ to 2 inches, at most, in practically all cases. When in operation, water to lubricate the stern tube and strut bearings circulates into the stern tube and through the openings or accessways between the smaller dimensioned ends of the fairwaters and the shafts, and through other orifices arranged along the body of the fairwaters. It is the sealing of all such openings and the openings between the after end of the after strut bearing barrels and the propeller hubs to which the present invention and discovery is primarily directed. Such openings, as well as the indicated relatively incidental circulation orifices provided in the bodies of the fairwaters and rope guards, as well as along the edges of the faying surfaces of the split halves of the fairwaters, rope guards, and strut barrels, as well as around the bolt heads and nuts which join the split halves of the fairwaters and rope guards, as well as any incidental openings in the welds, etc. of any portion of the structure being sealed, present gaps which must be sealed to preserve the bearing voids from deterioration by salt water and silt during inactivation. Such gaps or points to be sealed are termed "points of seal" in the art and such term is here employed in this context.

Bearing seals, according to earlier specifications, are generally of a composite built-up assembly of a wrapped or tailormade "boot," secured over the ends of the bearing barrel or special watertight metal extension of the stern tube, as required, and secured to the shaft or propeller hub by suitable lashings, clamps, bondings, or other means which will provide the necessary mechanical strength and watertightness of the seal. Additional mechanical strength is often required and obtained as necessary by application of one or more spiral overwraps of glasscloth tape or twine, laminated in a film of polyfunctional mercaptan, applied as a liquid. A final brush coating or film of polyfunctional mercaptan, also applied as a liquid, according to such specifications, after spiral wraps of the glasscloth tape are completed.

Generally considered, the bearing seal and method of fabrication thereof according to the present invention and discovery involves sandblasting or otherwise cleaning surface areas adjacent to the points to be sealed, masking the joints at the points of seal, as by masking or other adhesive tape, then priming the adjacent metal with a thin coat of a quick-curing polymerizing primer, curing the primer, and then applying to the primed adjacent surfaces and points of seal a layer of bearing seal forming composition to a desired thickness of about one inch or less, such thickness being substantial and generally proportional to and determined by the dimension of the span of the gap at the points of seal and by the diameter of the bearing, such layer of bearing seal forming material being a quick-curing, salt water resistant composition such as a catalyzed polyfunctional mercaptan or similar synthetic high-polymer, modified with a filler to have the rheological properties of a solid when applied as a paste layer of such thickness.

The liquid mercaptan heretofore used in conjunction with boot seals or spiral wrap overlays according to prior practice, having the rheological properties of a liquid, has a zero or only minimal yield strength value, and, when applied in any substantial thickness, such material in liquid form does not resist permanent deformation or flow during the period of cure, thus rendering it impossible to build up the requisite thickness dimension and resultant strength of the cured seal. This rheological property of low yield strength, value of the liquid mercaptan has been heretofore considered as rendering necessary use of auxiliary structural fabrication such as the rubber boots or spirally wrapped strips as set forth above.

It has been found that the necessary rheological properties can be achieved by adding a filler as a thickening and antisag agent to synthetic liquid high-polymers, and that such polymer-filler mix has a cohesive tensile strength less than its adhesive tensile strength when applied to a thickness of about one inch, or less as appropriate, at the points of seal when the surfaces adjacent to the points of seal are prepared to promote adhesion, such as by priming with a compatible synthetic, high-polymer primer composition. This factor of adhesive tensile strength greater than cohesive tensile strength has been found to prevail even though the filler ingredient of the bearing seal composition in many cases actually increases the cohesive tensile strength thereof as compared with the cohesive tensile strength of the cured polymer in the absence of such filler.

More specifically, a typical example of practice of the present invention, with the ship in drydock, involves dry sandblasting the metal or other surface areas adjacent to the points of seal, as at the stern tube, at the strut bearing barrel ends and fairwaters, at the rope guard, and at the propeller hub, as well as around whatever orifices or points where a preservative seal external of the vessel hull is desired. To prevent ingress of the abrasive sand into the bearing areas, the points to be sealed may be temporarily closed off by use of rags, rope, or masking tape, as necessary, with such temporary masking materials being removed after sandblasting, as desired.

Following sandblasting, the sandblasted surfaces are primed with a suitable synthetic, high-polymer primer composition, such as more fully set forth hereinafter by way of typical examples, to a distance of approximately three or four inches from each point of seal, and the primer is allowed to cure, as by drying for approximately one hour. Following curing of the primer, the gaps at the points of seal are closed off, as by being bridged with masking tape, following which a synthetic, high polymer seal forming material with its contained curing agent, such as are both also more fully set forth hereinafter by way of typical examples, is applied to the primed areas adjacent to and across the points of seal, the minimum thickness of application being about three-eighths of an inch and the thickness of application generally being governed by the consideration that a satisfactory thickness of the seal layer is about one-half inch per inch of gap at the point of seal, and that a wider gap at a given point of seal will require a generally proportionately greater thickness of seal layer.

Following application of the seal layer to the points of seal and adjacent system surfaces, it has been found advantageous to fair the surface of the seal layer by hand with rubber gloves dipped occasionally in a suitable solvent such as methyl ethyl ketone, in order to even and smooth the exterior surface of the seal, to ensure that there are no voids in the seal layer, and to ensure intimate contact of the seal layer with the primed adjacent surfaces, the uniformity of thickness, the homogeneity and resulting efficacy of the seal thereby being uniformly achieved.

Following curing of the bearing seal layer, the bearing seal can be tested for leaks in any suitable and generally conventional manner, such as by application of a soap solution externally of the seal and by application of from two to ten pounds per square inch pressure to the sealed bearing void area, with leaks being indicated by bubbling of the soap solution. It is a further advantageous feature of the present invention worthy of note in this connection that any leak occurring after initial fabrication of a given bearing seal can be readily sealed merely by further application of additional bearing seal forming composition and curing thereof in the normal manner, or by shortening the additional time necessary for cure to less than one-half hour by application of heat.

Following such test for watertight integrity of the bearing seal, the stern tube and strut bearing voids are filled with a suitable rust-preventive solution, which of itself forms no part of the present invention, such as about 0.3% strength sodium chromate water solution, such filling being through the water service valve opening available at the interior end of the stern tube, and through a ½ inch brass nipple screwed into a ½ inch drilled and threaded hole in the after end of the forward fairwater and vented through a ½ inch brass nipple screwed into the forward end of the after fairwater or rope guard, whichever the case may be. After filling, caps are screwed onto the filling niples so provided for filling and venting. Fig. 5 serves in part to illustrate a typical installation of such filling and vent nipples on an after strut bearing.

Drilling and threading of holes in the fairwaters and rope guard to receive said nipples can be accomplished conveniently when the fairwaters and rope guards are removed from the vessel, such removal being conventional practice in inactivation re-inspection.

As to formulation of the primer applied to the sandblasted system surfaces prior to the application of the seal forming material, a typical formulation is as follows: 25 parts chlorinated rubber, 5 parts Durez 10694, a phenolic resin manufactured by Durez Plastics and Chemicals, Inc. of North Tonowanda, New York, and 70 parts xylene, as a solvent. To this mixture is added, on a ratio of 15 parts of said mixture to 1 part by volume of an organic di-isocyanate such as Hylene M–50, which in turn consists of a mixture containing 50 parts "Hylene M" and 50 parts orthodichlorobenzene. The compound known as "Hylene M" is identified by the chemical name methylene-bis-(4-phenol-isocyanate). The primer is applied as a film to the sandblasted surfaces adjacent to the areas to be sealed, and may be as thin as 1/10 mil or even thinner, as desired. While the exact nature of the particular primer composition with respect to the development of appropriate adhesive properties is not known, it may be theorized that both the chlorinated rubber and the di-isocyanate, as well as the phenolic present in the primer composition, bond to the metal surfaces being sealed and to the subsequently applied sealant composition. As to the augmentation of the adhesion properties of the primer, the phenolic and di-isocyanate ingredients both have chemically active linkages, such as ·N:C:O groups in the case of the di-isocyanate, one of which active linkages in the proportions stated reacts with the phenolic ingredient, and the second of which reacts with a mercaptan group of the polyfunctional mercaptan ingredient of the bearing seal forming composition to achieve a degree of adhesion tensile strength greater than the cohesion tensile strength of the cured mercaptan-filler mix seal forming composition. It has also been theorized by Dr. Otto Bayer, in an article entitled "Polyurethanes," appearing in "Modern Plastics," vol. 24, No. 10, beginning at page 149, that an isocyanate reactive group reacts with the metal surface to produce primary valence bonds which contribute to a considerable degree to the adhesion of such a primer composition to a metal surface.

As to the formulation of the bearing seal forming composition, a typical specific example thereof, using a liquid polyfunctional mercaptan base, utilizes 100 parts commercially available polyfunctional mercaptan liquid polymer known as "Thiokol LP-2," manufactured by the Thiokol Chemical Corporation, mixed with 1 part stearic acid, as an oxidation retardant, and with 140 parts medium thermal carbon black, also known by the trade name "Thermax MT," as a filler, all proportions being by weight. The liquid polymer known and marketed as "Thiokol LP-2" is a cold setting, polyfunctional mercaptan having extremely reactive —SH terminals, with a viscosity of about 400 poises at 25° C., and with the following average structure:

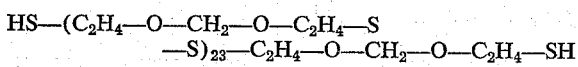

HS—($C_2H_4$—O—$CH_2$—O—$C_2H_4$—S
—S)$_{23}$—$C_2H_4$—O—$CH_2$—O—$C_2H_4$—SH with side mercaptan groups occurring occasionally in the recurring units. The proportionate number of parts of carbon black employed as a filler will be varied in practice from about 100 or 200 parts in the above formulation, for example, as determined by and in a manner generally proportional to the diameter of the seal, since larger bearing circumferences present a greater tendency for the sealant composition to sag before curing, and accordingly may render desirable a relatively higher modulus of elasticity.

A typical curing agent for setting up, i.e., cross linking, the typical bearing seal forming composition above presented, is prepared by mixing in a roll mill 50 parts lead peroxide, 45 parts dibutyl phthlate or similar plasticizer, and 5 parts stearic acid or similar oxidation retardant. The curing agent is mixed 1 part by weight with 10 parts by weight of the mercaptan-filler mix within about an hour prior to application of the seal layer, the seal forming composition then being applied as a paste to the primed adjacent surfaces and across the points of seal, such application being to a thickness approximating one-half inch per inch of span of the opening at a point of seal, such as between the propeller shaft and a fairwater, as shown in Fig. 3, for example.

A primer composition of the type specifically set forth above will cure in approximately one hour. After cure of the primer and after application of the seal forming layer over the area to be sealed, the time of cure of the seal layer is largely dependent upon drydock temperature and humidity conditions. As a practical matter, curing time for the coating at about 72 degrees F. for the formulation specifically set forth above is about 24 hours to obtain a durometer "A" hardness of 60. Should lower climatic conditions or restricted drydocking schedule require, the curing time of the seal forming layer may be shortened considerably by use of artificial heating such as by portable infrared heaters or forced hot air. By such forced cure the curing time of the seal forming layer may be cut down to about 2 hours or even less, as required.

The effectiveness of bearing seals and sealing procedures according to the present invention have been evaluated by formal experimental tests as well as by actual use in preservation of inactivated marine vessels. To simulate actual conditions for purposes of experimental testing, a 12-inch steel pipe to simulate a propeller shaft was welded to the center of a 24-inch circular steel plate and a simulated fairwater and strut barrel shell was tapered downwardly from the periphery of said circular steel plate to a dimension leaving a gap of about 1¼ inches circumferentially from the outside surface of the pipe, and nipples for filling, venting, and draining were installed in the simulated fairwater. Also provided in other test structures were a ½-inch orifice, a 13/16 inch orifice, and a slot 4 inches long and ½ inch wide, to simulate typical circulation orifices in the tapered portion of a fairwater.

The simulated fairwater assembly was then sealed according to the procedure presented, using the primer composition and bearing seal forming composition set forth above as first specific examples, the seal layer being applied about four inches along the fairwater and about four inches along the shaft from the point of seal, to a thickness of approximately one inch over the gap between the simulated fairwater and simulated shaft, the seal layer thickness being tapered down to about ⅜ inch outwardly from the gap on the surfaces adjacent to the point of seal. The primer and seal layer bonded thereon were also applied in the disclosed manner over an area extending about three inches from the simulated circulation orifices, to a thickness of about one-half inch.

Following room temperature cure of the seals, the simulated fairwater assembly and other test structures were subjected to fluid pressure tests, and the simulated fairwater assembly seal withstood a gas pressure of 20 pounds per square inch gauge in the simulated bearing void for one-half hour without failure or leakage. To establish the bursting pressure of the seals, hydrostatic pressure was employed and the pressure was increased step-wise to a point where rupture occurred in the seal layer of the fairwater assembly seal at a pulsating hydrostatic pressure of from 125 to 135 pounds per square inch gauge pressure, the rupture occurring in the seal at the point of seal between the simulated fairwater and the simulated shaft. Hydrostatic pressure tests of the other test structures disclosed that the seal over the ½ inch orifice withstood a pressure of 125 pounds per square inch gauge pressure of 24 hours without fail; the 13/16 inch orifice seal finally ruptured at 385 pounds per square inch gauge pressure, and the slot seal finally ruptured at 400 pounds per square inch gauge pressure.

To establish the point that it is necessary only to jack the propeller shaft to break the bearing seals according to the present invention and discovery in order to allow sea water to enter the bearing area for lubrication purposes upon reactivation of the vessel, another formal laboratory test was conducted, wherein a steel pipe 8⅞ inches outside diameter was placed inside a steel pipe of 12 inches inside diameter in which bearings of 8⅞ inches inside diameter had been welded, leaving a simulated gap of 1 9/16 inches at the point of seal. On the bottom of the smaller pipe a circular plate the same diameter as the outside diameter of the pipe was tacked, and in the center of this plate a stud with a rounded end was welded, to minimize the frictional force retarding rotation during test. To the bottom of the large pipe an 18" x 18" steel plate was tacked. To the top of the smaller pipe a circular plate was welded with three upright studs welded 120 degrees apart to this plate to provide points to apply torque load to the seal. After the gap point of the assembly had been sealed by the procedures here presented, using the primer and bearing seal forming composition according to the first specific examples thereof above related, the seal layer being built up to a thickness of about ½ inch at the point of seal. A lever bar was placed in rotating torque-delivering position with respect to the studs on the plate mounted on the pipe simulating the propeller shaft and a coffing hoist was fastened thereto at one end, the other end of the coffing hoist being connected to an accurately calibrated dynamometer using a micrometer dial gauge to measure the deflection. The coffing hoist was then jacked until the seal broke, a record of the dial gauge deflection being kept as the hoist was jacked. Jacking of the hoist was continued until the seal was completely sheared, the angle of rotation necessary to complete the shear being approximately 30 degrees. The distance from point of application of the load to the axis of rotation of the pipe simulating the propeller shaft was 37 inches, and torque load at breaking point of the seal was 280 lbs., resulting in a calculated foot pound torque load at the breaking point of the seal of 862.5 foot-pounds. The seal sheared along jagged edges in the area of the point of seal between the simulated fairwater and shaft, leaving a quite adequate circumferential opening in the shear area for water to pass therethrough for bearing lubrication.

Since the area in shear when breaking the seal is in direct proportion to the circumference or diameter of the shaft and the thickness of the seal, the torque load required to break all of the seals on a given vessel propulsion system can be readily calculated, knowing the diameter of the shaft, the diameter of rope guard, and the desired thickness of seal layer, from the above data showing that a torque of about 862.5 foot-pounds was necessary to break a seal having a ½ inch thickness dimension on a shaft 8⅞ inches in diameter, which calculation of course assumes that the seals on the vessel propulsion system were applied in accordance with the procedures here presented and have a thickness dimension of about one inch. Thus, on a ship such as an existing class of heavy cruisers, having a shaft 18 inches in diameter and a 30-inch diameter rope guard, and requiring four seals touching the shaft and one seal between the rope guard and propeller hub, the breakaway torque load necessary in jacking the propeller shaft is calculated at about 19,840 foot-pounds, or roughly somewhat less than 20,000 foot-pounds, which may be readily recognized as a relatively small torque load for the propeller shaft jacking gear on a ship of this class, which has approximately 380,000 foot-pounds rated maximum torque load.

Thus it is readily apparent that a marine vessel having propulsion system bearings external of the hull sealed according to the present invention may be simply and effectively reactivated without diver participation and consequent expenditure of time and money, merely by jacking of the propeller shaft or shafts of the vessel.

From the above and other experimental test work, cured bearing seals according to the present invention exhibited no tendency to sag or appreciably deform during curing, exhibited a high degree of aging resistance, exhibited an adequate cohesive tensile strength nevertheless less than the adhesive tensile strength, as self-evident from the results of the breakaway and bursting tests set forth, exhibited a high resistance to salt water and preservative solution as evidenced by a water absorption somewhat less than 2% over a prolonged period of exposure, and exhibited more than adequate strength and elasticity to obviate the necessity for extra external support when the bearing voids are filled with preservative solution in drydock.

Other types of primer compositions suitable for practice of the present invention include, by way of further example and not limitation, a solution of chlorinated rubber in toluene or xylene, made up to about 25% total solids. A suitable primer composition of this type comprises 80 parts Parlon, a fully (67%) chlorinated rubber product manufactured by the Hercules Powder Company; 20 parts Neoprene Type AC, a polychloroprene manufactured by E. I. du Pont de Nemours Company; 5 parts Hylene M; 5 parts litharge as an acid acceptor; and 1 part Neozone A, phenyl-alpha-naphthyl amine, also made by Du Pont to stabilize the composition against oxidation, all such ingredients being made up with a suitable solvent vehicle such as toluene to approximately 30% solids.

A further type of primer composition, to further illustrate the wide variety of compositions which may be so employed in practice of the present invention, is a composition similar to that first set forth for this purpose except that an epoxy-type resin such as Epon 828, a reaction product of bis-phenol (A) and epichlorhydrin, manufactured by the Shell Chemical Corporation, is substituted for Durez 10694.

Yet another example of a suitable primer, having a neoprene-type base, is as follows: Neoprene Type AC, 100 parts; Hylene M, 200 parts; Neozone A, 1 part; Bakelite Resin Type 14634, a 100% phenolic heat hardening resin manufactured by the Bakelite Corporation, a subsidiary of Union Carbide & Carbon Corporation, 45 parts; an aldehyde-amide accelerator such as 833, manufactured by du Pont, 4 parts; and litharge, 20 parts. The above ingredients are mixed with a suitable vehicle, such as toluene, to the desired viscosity, such as 25% total solids. In addition, sulfur flowers, in the amount of 2 to 4 parts, can also be employed to increase the cure rate at room temperature.

Other types of primer compositions exhibiting the requisite adhesion properties to the system surfaces adjacent to the points of seal and compatible to reactively bond with the particular type of bearing seal forming composition selected, will readily occur to those skilled in the chemical arts concerned.

Generally, an essential feature of the rubber polymer selected and employed as the basic material in the bearing seal forming composition is that, through use of suitable curing agents, the seal forming composition, built up to the thickness of the seal layer, may be cured to the requisite hardness at drydock ambient temperature or slightly above to enable effective curing within a reasonable time under normal working conditions. Other systems of synthetic high-polymers not necessarily elastomers are suitable to provide a good bearing seal forming composition within the scope of the present invention. For example, epoxy resins cured with amines will polymerize to the degree necessary under normal working conditions. A further example of other usable synthetic, high-polymer base materials for the bearing seal forming composition here presented is a mixture of Thiokol LP-2 and Thiokol LP-3 (another liquid polyfunctional mercaptan product of the Thiokol Chemical corporation), cured with di-isocyanates.

The product known as "Thiokol LP-3" in unconverted form is essentially a difunctional mercaptan made from 98 mole percent of bis (2-chloroethyl) formal and two mole percent of trichloropropane, a crosslinking agent, with a viscosity of 700–1200 centipoises at 25° C., and having the following average structure:

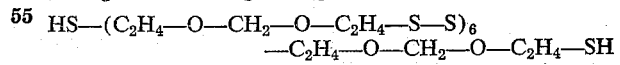

with side mercaptan groups occurring occasionally in the chain of repeating formal units and with some chain segments crosslinked at various points.

Another suitable polymeric system for the purpose of the present invention are polyester-type resins catalyzed with a peroxide such as benzoyl peroxide or methyl ethyl ketone peroxide together with a suitable polymerization accelerator such as cobalt naphthenate, and polyester-type resins cured with di-isocyanates. Additionally, in lieu of mercaptan rubbers, other rubbers based on the recently developed di-isocyanate derivative polyurethane rubbers can be utilized.

Various other fillers, as well as Thermax MT, may be employed, such as SRF carbon black, HMF carbon black, titanium dioxide, zinc sulfide, calcium carbonate, silica, esterified amorphous silica, such as Estersil GT, a du Pont product or mixtures thereof.

It will also be apparent that various other curing agents may be employed in lieu of lead peroxide, such as cumene hydroperoxide with triphenyl guanidine added to control the rate of reaction, hexamethylene tetramine with zinc oxide added, or such as the aforementioned di-isocyanates.

While the present invention primarily contemplates utilization of a synthetic high-polymer base material for the bearing seal forming composition which is initially liquid or semi-liquid in nature, with incorporaton of a filler as a thickening and anti-sag producing agent to achieve the appropriate rheological properties during curing of the seal, it will also be readily apparent that the requisite rheological properties may be achieved by other methods, such as by preliminary partial polymerization of the polymerizable ingredient at the manufacturing stage, which is further cured after application of the seal layer, or such as by selection of a polymerizable composition which is adaptable to application to the points of seal and adjacent surfaces in paste form, and which also inherently has the indicated rheological properties during cure so that the thickness dimension of the seal as applied will be maintained.

As previously stated, one important feature of a paste method of bearing sealing according to the present invention and discovery is the fact that the effect of previous deterioration of the metal on the performance of the seal is obviated by elimination of the welded bands or other mechanical seals required by prior methods. Another important and related advantage previously set forth is that the geometric configuration of the metal adjacent to a point of seal is unimportant. Briefly, any polymeric system which will cure at drydock temperatures or slightly above, which is applicable as a paste and has a sufficient yield strength value at the thicknesses of coating here contemplated, which has adequate cohesive tensile strength less than its adhesive tensile strength when cured, and which is salt water and preservative solution resistant, is suitable for use as the bearing seal forming composition of the present invention.

Other variations as to fabrication procedures and other suitable priming and/or sealant compositions which can be utilized for practice of the present invention and discovery will be apparent to those skilled in the arts involved, within the scope of the following claims.

What is claimed is:
1. The method of preserving and reactivating the external propulsion system of a marine vessel having bearing areas presenting substantial gaps to be sealed against the ingress of water for bearing preservation during inactive, floating stowage of said vessel, said method comprising dry sealing said gaps and the adjacent propulsion system surfaces with polymerized bearing seals applied in paste form to a substantial thickness and having a cured adhesive tensile strength exceeding the cohesive tensile strength, filling the bearing area so sealed with rust-preventive solution, rendering the vessel waterborne, and reactivating to propulsion system of the vessel by jacking the shaft of the propulsion system to break the bearing seals at the gaps.

2. In combination with an inactivated marine vessel having a propulsion system of the type with at least one water-lubricated bearing supported propeller shaft with accessways for circulation of lubricating water between said shaft and its supporting bearings, said accessways each constituting a substantial gap to be sealed against the ingress of water for bearing preservation during inactive, floating stowage of said vessel; a cured, synthetic high-polymer seal layer of substantial thickness spanning said gap and adhering to the adjacent vessel propulsion system surfaces, said seal layer of itself having adequate cohesive tensile strength to withstand the external hydrostatic pressure at said gap when the vessel is waterborne, yet having a cohesive tensile strength less than its adhesive tensile strength enabling fracture of said seal at said gap merely by jacking of said propeller shaft.

3. A combination set forth in claim 2, wherein said seal is constituted by a cured synthetic high-polymer, compounded with a non-polymerizing filler as a thickening and anti-sag agent.

4. A combination according to claim 2, wherein said seal spans said gap and extends at least about three inches outwardly for said gap along said adjacent propulsion system surfaces in producing in said seal an adhesive tensile strength greater than its cohesive tensile strength.

5. A combination according to claim 2, wherein the adhesion between said bearing seal and the adjacent propulsion system surfaces is promoted by a cured, synthetic, high-polymer primer coat between the said adjacent system surfaces and said seal, said primer coat being reactively bonded to said seal.

6. A combination according to claim 2, wherein the cured, synthetic, high-polymer seal having the cured properties specified is selected from the group consisting of mercaptan rubber, di-isocyanate derived polyurethane rubber, epoxy type resin cured with an amine, polyester type resin catalyzed with a peroxide, and polyester type resin cured with a di-isocyanate.

7. A combination according to claim 3, wherein said seal contains about 100 parts mercaptan rubber compounded with about 100 to 200 parts filler.

8. A combination according to claim 2, wherein the thickness of said seal is not less than about three-eighths inch at said gap.

9. In combination with an inactivated marine vessel having a propulsion system of the type with at least one water-lubricated, bearing-supported propeller shaft with accessways for circulation of lubricating water between said shaft and its supporting bearings, said accessways constituting substantial gaps to be sealed against the ingress of water for bearing preservation during inactive floating stowage of said vessel; seals spanning said gaps and coating the propulsion system surfaces adjacent to said gaps, said seals consisting essentially of a cured elastomer reactively bonded to said adjacent propulsion system surfaces by a thin film of cured elastomeric primer, said seals being of substantial thickness not exceeding about one inch at said gaps and extending along said adjacent propulsion system surfaces at least about three inches away from said gaps, said seals having compounded therewith a non-polymerizing filler and providing of themselves adequate cohesive tensile strength to withstand the external hydrostatic pressure at said gaps when the vessel is waterborne, the thickness of the seals, their filler ingredient and the bond thereof to the adjacent propulsion system surfaces providing a cohesive tensile strength in said seals less than the adhesive tensile strength thereof and permitting restoration of water circulation through said accessways by relative movement between the said adjacent propulsion system surfaces when said vessel is activated, without necessity for removal of the seals by a diver.

10. A combination according to claim 9, wherein the thickness of said seals is not less than about three-eighths inch and about one-half inch of thickness per inch of gap.

References Cited in the file of this patent

UNITED STATES PATENTS

| | | |
|---|---|---|
| 2,351,735 | Bake | June 20, 1944 |
| 2,453,471 | Switzer et al. | Nov. 9, 1948 |
| 2,496,060 | Mell et al. | Jan. 31, 1950 |
| 2,549,050 | Bropy et al. | Apr. 17, 1951 |
| 2,598,749 | Anderson | June 3, 1952 |
| 2,666,719 | Lissant | Jan. 19, 1954 |

OTHER REFERENCES

Bureau of Ships' Manual, chapter 9, section 9–169, May 1, 1953, Supt. of Documents, U.S. Government Printing Office, Washington, D.C.

Vinyl Seal Coating, Modern Plastics, vol. 27, May 1950, page 149.